United States Patent
Dechu et al.

(10) Patent No.: US 12,488,064 B2
(45) Date of Patent: Dec. 2, 2025

(54) GENERATING CHATOPS BASED PROCESS ORCHESTRATION FLOWS

(71) Applicant: International Business Machines Corporation, Armonk, NY (US)

(72) Inventors: Sampath Dechu, Acton, MA (US); Neelamadhav Gantayat, Bangalore (IN); Avirup Saha, Kolkata (IN); Dharma Teja Atluri, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 18/083,636

(22) Filed: Dec. 19, 2022

(65) Prior Publication Data

US 2024/0202285 A1  Jun. 20, 2024

(51) Int. Cl.
G06F 40/35 (2020.01)
G06F 18/23211 (2023.01)
G06F 18/2415 (2023.01)
G06F 40/166 (2020.01)
G06F 40/289 (2020.01)

(52) U.S. Cl.
CPC .... G06F 18/23211 (2023.01); G06F 18/2415 (2023.01); G06F 40/166 (2020.01); G06F 40/289 (2020.01); G06F 40/35 (2020.01)

(58) Field of Classification Search
CPC ...... G06F 40/35; G06F 40/174; G06F 40/279; G06F 40/30; G06F 16/285; G06F 16/35; G06F 40/289; G06F 18/23211; G06F 40/166; G06F 18/2415; H04L 51/04
See application file for complete search history.

(56) References Cited

U.S. PATENT DOCUMENTS 11,188,548 B2  11/2021  Taylor et al.
2007/0226637 A1  9/2007  Yaseen et al.
(Continued)

OTHER PUBLICATIONS

Mavaddat, Matin, "Business Process Discovery Through Conversation Log Analysis in Pluralist and Coercive Problem Contexts", Dissertation, University of the West of England, Nov. 2013, 223 pages (split into 4 parts).
(Continued)

*Primary Examiner* — Wilson W Tsui
(74) *Attorney, Agent, or Firm* — Harrity & Harrity, LLP

(57) ABSTRACT

Mechanisms are provided for automated generation of an electronic form for an electronic messaging subsystem. Historical conversation logs are obtained from the electronic messaging subsystem which comprise a plurality of communication sequences. Communication sequences within the historical conversation logs are clustered according to similarity of features. For each cluster the following operations are performed: identifying, within the cluster, sequences of normalized utterances that are repeated across communication sequences of the cluster; categorizing each sequence, in a set of the sequences of normalized utterances, as to whether the sequence can be represented as one or more electronic forms; and extracting, for each communication sequence in the cluster, attributes and corresponding attribute values. One or more electronic form data structures are generated based on the attributes and corresponding attribute values extracted for each communication sequence in the cluster.

20 Claims, 8 Drawing Sheets

(56) References Cited

U.S. PATENT DOCUMENTS

| | | | |
|---|---|---|---|
| 2011/0191383 | A1 | 8/2011 | Addala et al. |
| 2017/0097966 | A1* | 4/2017 | Kozareva ............... G06Q 30/02 |
| 2017/0192949 | A1* | 7/2017 | Gaither ................ G06F 40/174 |
| 2018/0183735 | A1* | 6/2018 | Naydonov ............. H04L 51/02 |
| 2019/0043483 | A1* | 2/2019 | Chakraborty ......... G10L 15/063 |
| 2019/0182382 | A1* | 6/2019 | Mazza .................. H04M 3/527 |
| 2020/0218780 | A1* | 7/2020 | Mei ......................... G06F 40/30 |
| 2020/0320978 | A1* | 10/2020 | Chatterjee ........... G10L 15/1822 |
| 2020/0342462 | A1* | 10/2020 | Todd ......................... G06N 5/04 |
| 2020/0396184 | A1* | 12/2020 | Perazzo ................. H04L 67/34 |
| 2021/0157618 | A1* | 5/2021 | Moon ..................... H04L 51/02 |
| 2022/0101839 | A1 | 3/2022 | George et al. |
| 2022/0308943 | A1* | 9/2022 | Srinivasan .............. G06F 40/40 |
| 2023/0281389 | A1* | 9/2023 | Lee ......................... H04L 51/02 704/9 |

OTHER PUBLICATIONS

"Label Propagation", Scikit-learn: Machine Learning in Python, accessed online Nov. 7, 2022, 3 pages.

"Label Spreading", Scikit-learn: Machine Learning in Python, accessed online Nov. 7, 2022, 4 pages.

Ahmadvand, Ali, "User Intent Inference for Web Search and Conversational Agents", Doctoral Consortium, 13th ACM International WSDM Conference (WSDM '20), Feb. 3-7, 2020, 2 pages.

Anonymous, "System and Method for Conformance Checking of Conversational Process Instance Against a Conversational Process Model", IP.com Prior Art Database, May 11, 2020, 6 pages.

Boren, Rackley et al., "Deliver Modern UI for IBM BPM with the Coach Framework and Other Approaches", IBM Corporation, Oct. 2016, 428 pages. (Split into 2 Parts).

Chakraborti, Tathagata et al., "D3BA: A Tool for Optimizing Business Processes Using Non-Deterministic Planning", arXiv:2001.02619v2 [cs.AI], Feb. 4, 2020, 7 pages.

Chatterjee, Ajay et al., "Intent Mining from past conversations for Conversational Agent", arXiv:2005.11014v3 [cs.CL], Nov. 12, 2020, 13 pages.

Han, Lei et al., "User Interface Derivation for Business Processes", IEEE Transactions on Knowledge and Data Engineering, Jan. 9, 2019, 14 pages.

Muise, Christian et al., "Planning for Goal-Oriented Dialogue Systems", arXiv:1910.08137v1 [cs.AI], Oct. 17, 2019, 42 pages.

Sheinin, Vadim et al., "Quest: A Natural Language Interface to Relational Databases", Language Resources and Evaluation Conference (LREC 2018), May 7, 2018, 5 pages.

Taymouri, Farbod et al., "A Deep Adversarial Model for Suffix and Remaining Time Prediction of Event Sequences", Proceedings of the 2021 SIAM International Conference on Data Mining (SDM). Society for Industrial and Applied Mathematics, 2021, submitted version arXiv:2102.07298v1 [cs.LG], Feb. 15, 2021, 9 pages.

Wang, Dong et al., "Understanding Computer-Directed Utterances in Multi-User Dialog Systems", IEEE International Conference on Acoustics, Speech and Signal Processing (ICASSP 2013), May 26, 2013, 5 pages.

Wu, Min et al., "Adding Structured Data in Unstructured Web Chat Conversation", Proceedings of the 25th Annual ACM Symposium on User Interface Software and Technology (UIST '12), Oct. 7-10, 2012, 8 pages.

\* cited by examiner

GENERATING CHATOPS BASED PROCESS ORCHESTRATION FLOWS

BACKGROUND

The present application relates generally to an improved data processing apparatus and method and more specifically to an improved computing tool and improved computing tool operations/functionality for automatically generating ChatOps based process orchestration flows.

ChatOps is a collaboration model that connects people, tools, process, and automation into a transparent workflow. This flow connects the work that is needed, the work that is happening, and the work that was done in a persistent location that is staffed by people, bots, and related tools. By bringing tools into conversations and using a chatbot that works with key plug-ins and scripts, teams can automate tasks and collaborate to work better, cheaper, and faster.

With ChatOps, while in a chat room, team members type commands that the chatbot is configured to run through custom scripts and plug-ins. The commands can range from code deployments, to security event responses, to team member notifications. The entire team collaborates as commands are run.

GitHub®, available from GitHub, Inc., pioneered ChatOps as a way to automate most operations-related tasks with a chatbot. Several ChatOps tools are available including Slack® (available from Slack Technologies, Inc.) and HipChat® (available from HipChat, Inc.), for example. ChatOps integrates development tools, operations tools, and processes into a collaboration platform so that teams can efficiently communicate and manage the flow of their work. The solution maintains a timeline of team communication that provides a record and keeps everyone up to date, avoiding information overload.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, for automated generation of an electronic form for an electronic messaging subsystem. The method comprises obtaining historical conversation logs from the electronic messaging system, where the historical conversation logs comprise a plurality of communication sequences. The method further comprises clustering communication sequences within the historical conversation logs according to similarity of features to thereby generate clusters of communication sequences. In addition, the method comprises, for each cluster in the clusters of communication sequences: identifying, within the cluster, sequences of normalized utterances that are repeated across communication sequences of the cluster; categorizing each sequence, in a set of the sequences of normalized utterances, as to whether the sequence can be represented as one or more electronic forms; and extracting, for each communication sequence in the cluster, attributes and corresponding attribute values. Moreover, the method comprises generating, for at least one cluster, in response to at least one sequence of the at least one cluster being categorized as being able to be represented as one or more electronic forms, one or more electronic form data structures based on the attributes and corresponding attribute values extracted for each communication sequence in the at least one cluster. Thus, the method is able reduce time and effort for accomplishing tasks by providing electronic forms that can be used to acquire information needed by entities involved in performing a task.

In some illustrative embodiments, the method further comprises determining, based on an artificial intelligence computer model analysis of the historical conversation logs, a user preference for a user with regard to using electronic forms or using a conversational interchange of messages to accomplish tasks. The method also comprises, in response to the user preference for the user being to use electronic forms, presenting an electronic form, based on the one or more electronic form data structures, to the user via the electronic messaging system. Thus, with these illustrative embodiments, electronic form presentation can be tailored to the preferences of the particular user.

In some illustrative embodiments, clustering communication sequences within the historical conversation logs comprises executing natural language processing computer logic on the historical conversation logs to extract the features from the historical conversation logs, wherein the features comprise terms or phrases that reference tasks or issues being discussed in the historical conversation logs. Thus, the clustering is specific to tasks and issues presented as part of conversations and thus, a specific type of clustering is performed.

In some illustrative embodiments, identifying sequences of normalized utterances that are repeated across communication sequences of the cluster comprises determining a frequency of occurrence of each sequence of normalized utterances in the identified sequences of normalized utterances, and selecting the set of the sequences of normalized utterances as those sequences of normalized utterances for which the frequency of occurrence is equal to or greater than a predetermined threshold value. Thus, the illustrative embodiments are able to perform the operations with a specific set of sequences that are frequently occurring rather than for all sequences.

In some illustrative embodiments, categorizing each sequence, in the set of the sequences of normalized utterances, as to whether the sequence can be represented as one or more electronic forms comprises executing at least one of a rule-based classifier computing model or a trained neural network computer model on the patterns of characteristics of the sequence to classify the sequence as either a first class of sequence for which one or more electronic forms may be used to gather information gathered as part of the sequence or a second class of sequence for which one or more electronic forms may not be used. Thus, artificial intelligence computer modeling is leveraged to learn classifications of sequences with regard to whether they are able to be represented as electronic forms.

In some illustrative embodiments, for each cluster in the clusters of communication sequences, the method involves identifying and storing a triggering utterance for the cluster in association with the one or more electronic form data structures, where the triggering utterance is an utterance that, when identified in a subsequent electronic communication, triggers presentation of an electronic form in the electronic messaging system based on the associated one or more electronic form data structures. Thus, with these illustrative embodiments, triggering utterances can be detected and used to trigger presentation of electronic forms rather than requiring users to go through a more involved interchange of messages to acquire the same information.

In some illustrative embodiments, generating the one or more electronic form data structures comprises generating a plurality of different electronic form data structures, wherein each different electronic form data structure corresponds to a different entity in an electronic communication interchange, and wherein the plurality of different electronic form data structures are associated with a workflow sequence to present corresponding electronic forms to the different entities in accordance with an order of the workflow sequence. Thus, the illustrative embodiments are able to sequence or order the electronic forms and present the electronic forms to the particular users or entities involved in a workflow in accordance with this ordering or sequence so as to facilitate the performance of a task in a more automated manner.

In some illustrative embodiments, the method further comprises generating an electronic form based on the one or more electronic form data structures, in response to a normalized utterance of the at least one cluster being detected in a subsequent electronic communication of an ongoing electronic communication session between a plurality of users. Moreover, the illustrative embodiments include presenting the electronic form to at least one user in the plurality of users via the electronic communication system as part of the ongoing electronic communication session, wherein the electronic form comprises fields that are of a type corresponding to the attributes and attribute values. Thus, the electronic forms may be interjected into the electronic communication interchange between users or entities and thereby reduce the amount of time and effort on the part of the users/entities to acquire the information needed to complete tasks.

In some illustrative embodiments, the fields present predetermined value options for selection by the at least one user based on the attribute values for attributes corresponding to the fields. Thus, the electronic forms can be tailored to the particular types of attributes and values for these attributes so that users can quickly determine how to fill out the electronic forms and what values are acceptable.

In some illustrative embodiments, the electronic messaging system is a subsystem of a ChatOps environment, and wherein the historical conversation logs are logs of asynchronous electronic communications between two or more entities via the subsystem. Thus, ChatOps environments in which multiple users collaborate to accomplish a task are made more efficient by using electronic forms generated through the mechanisms of the illustrative embodiments to gather information in a more timely and less effort intensive process.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide an improved computing tool and improved computing tool operations/functionality for automatically generating ChatOps based process orchestration flows. More specifically, the illustrative embodiments provide automated computing tools and functionality to generate such ChatOps based process orchestration flows based on historical asynchronous electronic communication logs of a ChatOps environment, and generate task metadata (e.g., goal, input, output, entity and role) from the asynchronous electronic communication logs. The illustrative embodiments further automatically generate user interaction preferences for form based or conversation based task specification using historical asynchronous electronic communication logs and then present a user interface based on automatically determined user interaction preferences. The illustrative embodiments further automatically generate declarative ad hoc process artifacts for orchestration within the ChatOps environment, where a declarative process is one that is specified in a high-level language used to solve problems without requiring specification of exact procedures.

Figures 1A, 1B:
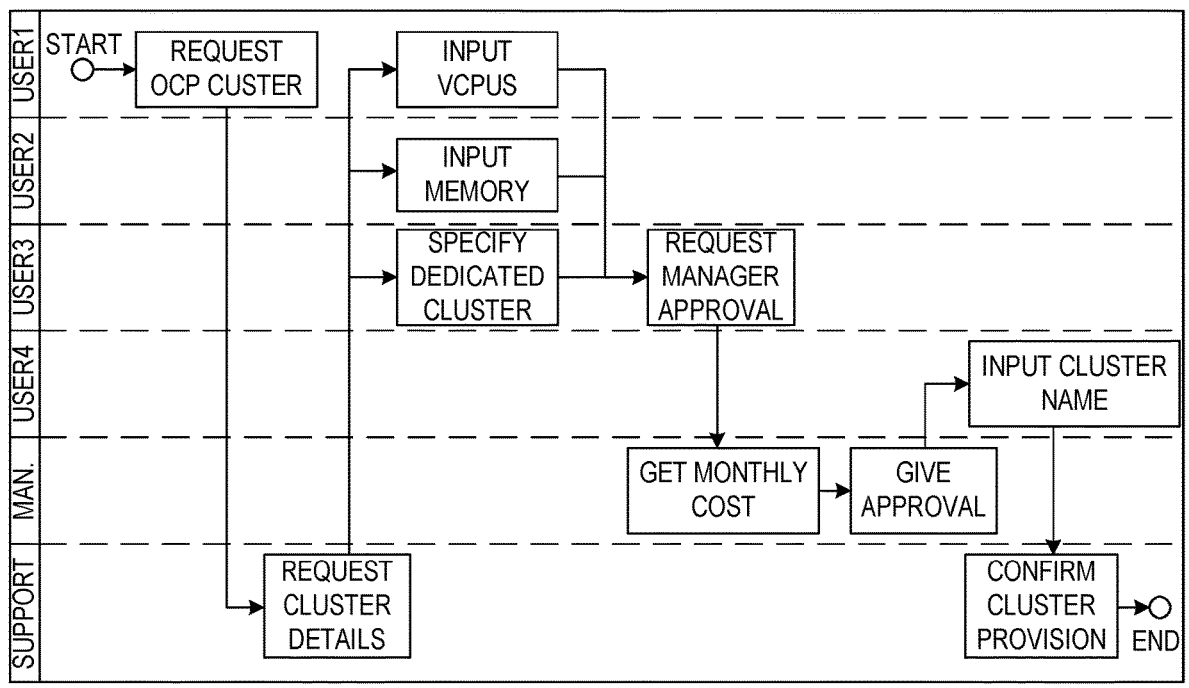
FIG. 1A shows an example interchange of electronic communications through a ChatOps computing system's electronic messaging tool in which a user requests the provisioning of an open shift cluster on IBM Cloud.
FIG. 1B shows an example of a workflow that may correspond to a ChatOps communication interchange.

In a ChatOps computing system, users are able to collaborate through an electronic messaging tool in order to work together on a project or tasks within a project. Often times, this involves one user asking for other users to perform tasks in support of the project or other tasks. For example, FIG. 1A shows an example interchange of electronic communications, e.g., text messages, through a ChatOps computing system's electronic messaging tool in which a first user (User1) requests the provisioning of an open shift cluster on IBM Cloud. The information technology (IT) support individual (Support) asks how many virtual CPUs (vCPUs) the user needs, and a second user (User2) responds with an answer of 20 GB. Support then asks if the users want to provision a shared cluster or a dedicated cluster. User2 then asks what this means, and Support answers, followed by yet another user (User3) responding that they wish to have a dedicated cluster. As can be seen from FIG. 1A, this conversation between the Support individual and the users continues with discussions of costs and further involving a manager to approve the costs as well as yet another user (User4). Thus, a lengthy conversation involving multiple messages and interactions between users is required to achieve a task of provisioning an open shift cluster in accordance with the original request.

FIG. 1B shows an example of a workflow that may correspond to a ChatOps communication interchange, such as that shown in FIG. 1A. As shown in FIG. 1B, the workflow for performing a project or task may comprise many different entities, e.g., multiple uses, managers, and support team entities, with different responsibilities and may require interaction between multiple users through a ChatOps electronic communication tool which, as described hereafter, is improved through the improved computing tool and improved computing tool functionality for automated electronic form integration with such ChatOps electronic communication tools. As shown in FIG. 1B, a first user may request an OCP cluster to be provisioned and a support team member may request cluster details. Then, the various users involved in the ChatOps messaging session may provide input regarding number of CPUs, required amount of memory, and whether the OCP cluster should be dedicated or shared. The workflow then proceeds to manager approval by the manger, etc.

It has been determined that, with workflows involving multiple entities that are interacting to achieve a task, and in which requests for information are exchanged in order to achieve such tasks, these interactions can be more efficiently performed, in some situations, with an electronic form based workflow. This is especially true in situations where similar tasks are requested by the same or different users at various times. That is, if provisioning an open shift cluster on IBM Cloud is a task that is repeatedly requested by the same or different users, then rather than having to go through the depicted interchange of electronic communications as shown in FIG. 1A each time a user requests this task, a form may be developed and presented to the user so that they can provide the necessary information that other individuals need to accomplish the requested task. However, there is no current mechanism for automatically generating such forms or determining when to provide such forms as part of an interchange between users in a ChatOps environment. Moreover, many times, as various levels of users may be involved in accomplishing the task, e.g., a first level of users may request the task, but a second level of users (e.g., managers) may need to authorize the tasks and/or costs involved, such that different forms at different times during the workflow of servicing the request may be required, knowing which forms and when and where to provide such forms in a ChatOps environment is a difficult task to accomplish. Adding to this, some users may not wish to utilize forms when involved in ChatOps interactions while others may prefer such forms. It would be beneficial to provide an automated computing tool that can determine these different types of users and adapt the presentation of forms to the individual user preferences as automatically determined from a historical analysis of interactions by the users.

The illustrative embodiments provide an improved computing tool that extracts features from historical conversations in a ChatOps environment, e.g., text messages in interchanges or interactions between users as part of a collaboration, to identify tasks, or issues associated with tasks, referenced in these conversations as well as categories and types of these issues/tasks. It should be appreciated that throughout this description, references will be made to "conversations" which are intended to refer to the exchange, amongst a plurality of entities, of electronic communications via one or more data processing systems and computing devices, whether mobile computing devices or stationary computing devices. In particular, the ChatOps environment may provide an electronic messaging computing tool with which the mechanisms of the illustrative embodiments operate and which the mechanisms of the illustrative embodiments improve by providing additional and improved computer functionality with regard to automatic generation and presentation of workflow electronic forms for gathering information needed to complete tasks and for coordinating such information gathering amongst multiple entities at different levels of hierarchy within an organization and having different responsibilities as part of the workflow.

With the mechanisms of the illustrative embodiments, natural language processing computer tools may be used to extract features from electronic messages in the ChatOps environment to thereby identify terms/phrases corresponding to issues/tasks and concepts corresponding to issues/tasks to be performed. The issues/tasks are clustered accordingly to identify these categories and types and, for each cluster, sequences of normalized utterances which are repeated across conversations are identified, e.g., for a cluster of issues/tasks having to do with provisioning an OpenShift cluster (where "OpenShift" is a short form of Openshift Container Platform (OCP) and may be also referred to as an OCP cluster), the normalized utterances of request OpenShift cluster, input number of CPUs, input amount of memory in GBs, input cluster name, input cluster cost, get manager approval, etc., may be present and identified as being associated with that cluster of issues/tasks. Normalized utterances are generalized versions of terms/phrases specified in natural language text based electronic communications. The term "utterances" references that natural language aspect of these sequences of terms, and in some illustrative embodiments, the utterances may in fact be audible utterances spoken by a user that are input and converted to a textual form through speech-to-text conversion, with the mechanisms of the illustrative embodiments operating on the textual form of the utterances in the speech input. The normalized utterances may be combined into sequences where a sequence is comprised of a trigger normalized utterance (e.g., the first normalized utterance, such as "request OpenShift cluster"), followed by additional normalized utterances terminating with an action being performed, specified as having been performed, the chat conversation terminating, or a subsequent trigger normalized utterance being encountered.

A frequency of occurrence of such normalized utterances may be determined through maintaining counts of the normalized utterances, or performing other statistical measures of occurrences, to determine, for each cluster of issues/tasks, which normalized utterances are frequently occurring. For example, one or more threshold frequency values may be predetermined and the frequency of occurrence of an utterance may be compared to these one or more threshold frequency values to determine if the frequency equals or exceeds at threshold, in which case the corresponding normalized utterance may be tagged a frequently occurrent normalized utterance.

For these frequently occurring normalized utterances, a determination is made as to whether one or more electronic forms can be generated for minimizing the interactions between entities associated with the sequence of normalized utterances, e.g., a single electronic form or sequence of electronic forms that encapsulates the interchange between users as a set of text and fields into which a user can provide input to specify various attributes associated with the issue/task, e.g., number of CPUs, amount of memory, cluster name, whether the cluster is open or dedicated, etc. In some illustrative embodiments, this determination may be performed by applying a rule-based classifier computing model or trained neural network computer model to evaluate a pattern of characteristics in the sequence of normalized utterances and classify the sequences as one that should or should not be represented as an electronic form. For example, a first rule may look to the pattern of normalized utterances to determine if the sequence consists of a series of inputs followed by an action, which is indicative of a pattern for which an electronic form may be used to receive the inputs in one electronic form rather than multiple interchanges between entities via electronic messaging. As another example, a second rule may look to the pattern of normalized utterances to determine if the individual messages include long textual inputs, e.g., a length of a message equal to or greater than a predetermined threshold length, which indicates that the user is having to explain or is describing something in greater detail, which is less suitable for representing in an electronic form. Thus, by applying various rules and/or evaluating characteristics (or features) of the sequence of normalized utterances via a neural network computer model, a classification of the frequency occurrent sequence of normalized utterances may be generated as to whether it is suitable for replacement by an electronic form or not.

For those frequently occurring sequences of normalized utterances, the patterns of characteristics may be further evaluated to determine common mandatory attributes and their possible values. For example, key terms/phrases may be identified in the sequence of normalized utterances, which are indicative of mandatory attributes specified in instances where a request for information is presented in the interchanges represented in the sequence of normalized utterances, followed by a user entering a response may be identified and the particular user response may be used to determine the possible values for the attributes. That is, a key value store may be maintained that stores previously supplied input values for corresponding attributes, such that these key values may be used as suitable electronic form inputs values that may be presented to subsequent users as part of the electronic form, e.g., as suggestions or selectable options. The identification of the possible values from the key value store may include identifying the types of the values and ranges of the input values, e.g., Boolean (yes/no), ordinal (low/medium/high), restricted choices (32 GB, 64 GB, etc.), and the like. Thus, for example, if a frequently occurring sequence of normalized utterances indicates a need to specify how many CPUs are needed and how much memory is required, the instances of these sequences of normalized utterances may be analyzed to identify user responses of values and what those values are, e.g., values of 1, 2, 3, and 4 for CPUs and 32 GB, 64 GB, 128 GB for memory. From these key values stored in the key value store, an analysis may be performed to determine that for CPUs, the values are integers in the range from 1-4 and for memory, the values are restricted values of 32 GB, 64 GB, or 128 GB.

Thus, through this process, the task metadata is determined which includes the sequence of normalized utterances, and the corresponding mandatory attributes and their associated possible values. This metadata may be used to automatically construct one or more electronic forms for collecting the mandatory attribute values for the attributes when subsequent similar tasks are being performed through the ChatOps system, as may be indicated by subsequent instances of the triggering normalized utterance, for example. That is, one or more electronic forms may be automatically generated for the workflow represented by the sequence of normalized utterances, where different electronic forms may be generated for different levels of users, e.g., one for lower level users, a second one for management level users, etc., or for users that have different levels of responsibility. In response to the same triggering normalized utterance being found in a subsequent interchange in the ChatOps system, the corresponding electronic form(s) may be automatically retrieved from an electronic forms repository and presented to the user via the ChatOps messaging subsystem, e.g., in the example of FIG. 1A, in response to detecting another instance of "request OpenShift cluster", an electronic form for Request for OCP cluster may be retrieved which has fields for specifying the number of CPUs required, the amount of memory required, the type of cluster (shared/dedicated) requested, and the cluster name.

In some illustrative embodiments, to generate the electronic form, a natural language unit (NLU) computer model of the illustrative embodiments is trained to classify the intent of the sequence of normalized utterances, where the intent is represented by a sequence of necessary steps that must follow the triggering normalized utterance of the sequence. If more than one set of necessary steps is possible, then in some illustrative embodiments, a prediction computer model may be used to predict the intent from amongst the multiple possibilities to identify the most likely one. From the determination of the intent, an ad hoc declarative sequence of tasks for the given sequence of normalized utterances is generated along with a corresponding one or more electronic forms representing the mandatory attributes and their possible values.

In some illustrative embodiments, historical conversation data may be further used to identify user interaction preferences and define a user profile for a given user. That is, from the historical conversation data, identifiers of users involved in conversations may be identified from the conversation data and features may be extracted from the conversation data indicative of various characteristics including characteristics specifying whether the user repeatedly asks the same questions, or submits the same requests, number of times the user has engaged in certain types of conversations, and whether the user has used electronic-form based input before and has approved of it, or at least has not disapproved of it. Of course, other characteristics may also be extracted from the historical conversation data as desired for the particular implementation. These various features may be extracted from the conversation data to generate a feature vector for a user.

This process can be performed for a large number of historical conversations and users so as to generate training and test data sets for training and testing a predictive computer model, such as a neural network computer model, to predict whether a user will be amenable to electronic form based interactions or would prefer non-electronic form based interactions, i.e., more conversational interactions, such as that shown in FIG. 1A. For example, some of the users identified in the historical conversation data may have ground truth labels in the form of positive inputs indicating an approval or desire to utilize electronic forms during conversations via the ChatOps messaging subsystem. In addition, some of the users may provide a negative input specifying that these users do not wish to use electronic forms. These will serve as labels indicating a ground truth for these users such that the predictive computer model may be trained through a machine learning training operation, such as a supervised machine learning process or semi-supervised machine learning process, to predict whether or not users are likely or unlikely to want to use electronic forms as part of their conversations via the ChatOps messaging subsystem. This learning may be dynamically updated based on user feedback during runtime conversations as additional inputs from users as to their desires for electronic form based inputs or not are received.

The determinations of these preferences for electronic form based user interfaces during ChatOps messaging subsystem interactions, or for non-electronic form based interactions, may be used to define user profiles for each user of the ChatOps system. These preferences may be general preferences for all ChatOps messaging subsystem interactions, or may be more fine-grained and associated with specific frequently occurring sequences of normalized utterances, e.g., trigger normalized utterances specifying a task to be performed. These user profiles may be used during runtime operation to determine, for detected trigger normalized utterances, whether to present electronic form user interfaces to users to gather information for performing requested tasks.

During runtime operations, which may occur after an initial training of machine learning computer models and generation of user profiles and declarative workflow definitions, but which may be substantially at a same time as continued machine learning is performed with regard to the machine learning computer models using additional gathered runtime data, a user may interact with a ChatOps messaging subsystem and present streaming conversation data. The streaming conversation data is provided by the ChatOps messaging subsystem to an orchestrator that uses a natural language understanding (NLU) model, such as that previously mentioned, to analyze the utterances in the streaming conversation data and determine if a trigger normalized utterance is present. If such a trigger normalized utterance is detected, e.g., "request OpenShift cluster", the orchestrator determines if a declarative workflow definition is already defined for this trigger normalized utterance. In addition, the orchestrator determines whether the particular user that input the trigger normalized utterance is likely to want to use electronic form based input or conversational input for gathering the necessary information to perform the requested task. These operations may be performed at substantially the same time, sequentially, or in any desired order.

If the user is predicted to want to use electronic form based input and a declarative workflow definition exists in association with the trigger normalized utterance, then the declarative workflow definition with its corresponding electronic form user interface(s) are retrieved and provided to the entities involved in the runtime conversation of the streaming conversation data. That is, as part of the streaming conversation data, identities of the entities involved, as well as the organization relationships, e.g., worker, manager, etc., are part of the streaming conversation data and corresponding electronic forms may be sent to these entities in accordance with the defined workflow, e.g., first providing a first electronic form to a user, taking the information entered by the user into the first electronic form and populating a second electronic form with additional fields for a support entity to populate, a third electronic form populated with information from the first and second electronic forms and having additional fields for a manager to populate, and then providing a fourth electronic form back to a support entity and/or user to specify the results of the electronic form interaction. Of course, if the user is predicted to not want to use electronic form based input in general or for this particular trigger normalized utterance, then the ChatOps messaging subsystem interchange between users is permitted to continue in a non-electronic form based manner, i.e., a conversational manner, such as shown in FIG. 1A.

In some cases, such as when a user does not already have a predefined user profile, the user may be asked whether or not they wish to use electronic forms to input information for performing a task. Based on the user's input, electronic forms may or may not be used. In addition, this information may be used to generate the user profile for future use.

Thus, the illustrative embodiments provide an improved computing tool and improved computing tool functionality for automatically generating electronic forms for automated presentation to users during ChatOps messaging subsystem conversations for gathering information for performing requested tasks and orchestrating presentation of these electronic forms in accordance with automatically generated declarative workflow definitions associated with triggering normalized utterances. The illustrative embodiments automatically learn preferences of users with regard to whether or not users are likely to want to use electronic form based input of task information or not. During runtime operation, the illustrative embodiments provide automated computing tools for detecting triggering normalized utterances and determining whether to present electronic form based workflows to users/entities involved in runtime streaming conversations in the ChatOps messaging subsystem, and how to present these electronic form based workflows to those involved in the conversation. The result is that, for conversations involving electronic form based task information input, the interchange of messages between users/entities is minimized while still being able to gather user input for performing the requested tasks.

As discussed above, the illustrative embodiments provide improved computing tools that generate declarative workflow definitions and corresponding user interfaces as electronic forms, where the workflows may comprise a sequence of required steps to be performed and corresponding electronic forms/user interfaces, that are used to perform those steps. Thus, a workflow may comprise a sequence of electronic forms and user interfaces which may use information gathered from a previous electronic form to populate a current electronic form in the workflow.

Figure 2:
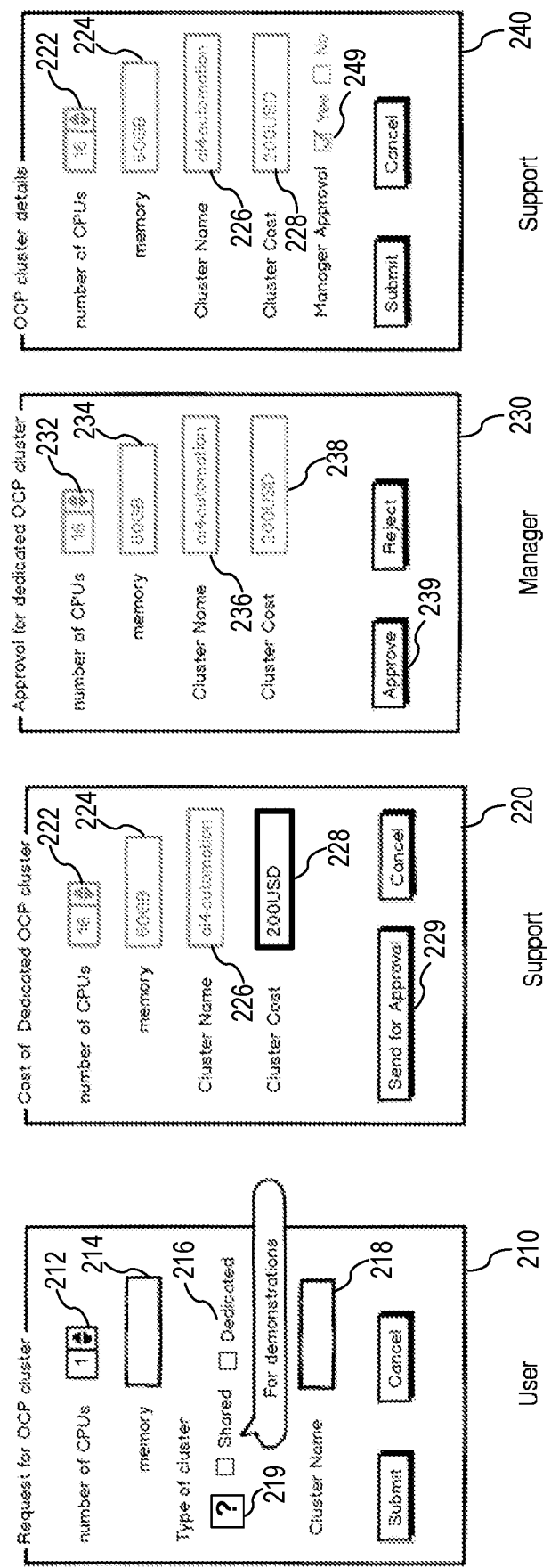
FIG. 2 is an example diagram of electronic forms in accordance with one illustrative embodiment.

FIG. 2 is an example diagram of electronic forms in accordance with one illustrative embodiment. The example shown in FIG. 2 corresponds to the interchange of messages shown in FIG. 1A, as an example, and is specifically for provisioning an OpenShift cluster in IBM Cloud. This is just one example and other types of tasks and corresponding utterances may have other electronic forms and user interfaces automatically generated by the mechanisms of the illustrative embodiments without departing from the spirit and scope of the present invention.

As shown in FIG. 2, in response to natural language understanding (NLU) computer model, executing on a conversation being conducted via a ChatOps messaging subsystem, detecting a trigger normalized utterance, the orchestrator, assuming that a declarative workflow definition exists for the trigger normalized utterance, and the user preferences indicate a desire to use electronic forms, presents the electronic forms 210-240 to corresponding entities involved in the conversation in accordance with the defined workflow. In the first electronic form 210, which may be presented to the User1 in FIG. 1A in response to User1 entering the input text message "Can you please provision open shift cluster on IBM Cloud?", fields 212-218 are provided based on the learning of attributes and possible values as discussed above, for the user to enter inputs of number of CPUs, amount of memory, type of cluster, and cluster name, which all correspond to the learned task metadata. The fields 212-218 may include user interface elements that present the possible values for the fields in appropriate configurations, e.g., dropdown menus, selectable predefined values, free-form fields, checkboxes, user interface buttons, and the like. In some cases, additional hints or question user interface elements 219 may be provided to ask about the fields, e.g., in cases where users ask about what a field may mean in historical conversational data, answers to those questions may be stored and associated with such hints/question user interface elements. For example, in FIG. 1A, User2 asked the question "what does that mean" with regard to provisioning the cluster as a shared or dedicated cluster, such that the answers provided by the Support entity in response to this question may be associated with a hint/question user interface 219 such that the answers may be presented in response to the user selecting the hint/question user interface 219. In addition, the electronic form 210 may further include user interface buttons to submit or cancel the requested task or entry of user input via the electronic form.

Assuming that the user submits the first electronic form 210, in accordance with the workflow corresponding to the interchange of messages between entities and actions taken as shown in FIG. 1A, a second electronic form 220 is presented to the Support entity, which may be a user or an automated tool, that comprises fields 222-228 in which some of the fields are pre-populated with information entered by the user in the first electronic form 210 and other fields that the Support entity populates. For example, in the depicted example, the user enters the number of CPUs, amount of memory, and cluster name in first electronic form 210, whereas the Support entity populates the field 218 with the cluster cost. Similar to the first electronic form 210, the second electronic form 220 includes selectable buttons 229, assuming that the Support entity is a user, for submitting the OCP cluster request to a manager entity for approval or canceling the input via the electronic form 220.

Assuming that the Support entity populates field 218 and submits the request to management for approval via the button 219, a third electronic form 230 is presented, in accordance with the workflow, to a manager. This third electronic form 230 includes fields 232-238 which have information pre-populated with the information provided by the user and Support entity via electronic forms 210 and 220. This third electronic form 230 includes user interface buttons 239 for approving/rejecting the request to provision the OCP cluster. Based on the response from the manager, the fourth electronic form 240 is returned to the Support entity specifying whether the request was approved or not. The fourth electronic form 240 includes fields 242-248 which again comprises the information entered previously by the user and Support entity, as well as field 249 which includes the result of the manager input via the third electronic form 230. Based on the fourth electronic form 240, assuming the Support entity selects the "submit" user interface button, the support entity or team may then provision the OCP cluster. That is, another workflow for provisioning the OCP cluster is initiated which involves passing the request on to information technology systems engineers with the provided cluster details so that the request may be fulfilled, i.e., the OCP cluster may be provisioned and the access credentials may be provided to the requesting users, such as through chat, email, or the like. This workflow may be completely automated or may involve ChatOps with or without form based input depending on the prevailing procedures.

The above shows an example of a sequence of electronic forms (or user interfaces) that correspond to an ad hoc declarative workflow definition. It should be appreciated that the particular sequence of electronic forms will differ in their content and/or sequence depending on the particular workflows and tasks that are being handled via the ChatOps system. However, in general, the electronic forms will have the necessary content to specify the attributes and the possible values or input for those attributes that are to be provided by the particular user/entity and mechanisms for submitting those values and input.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As described above, the illustrative embodiments of the present invention are specifically directed to an improved computing tool that automatically learns, through machine learning processes, attributes and possible attribute values associated with frequently occurring normalized utterances in ChatOps messaging interactions, automatically generates ad hoc declarative workflow definitions with corresponding electronic forms encapsulating the attributes and possible attribute values, automatically learning user preferences for electronic form input during conversations via the ChatOps messaging subsystem, and then automatically presenting electronic forms during runtime streams of communications via the ChatOps messaging subsystem based on user preferences and automated detection of triggering normalized utterances. All of the functions of the illustrative embodiments as described herein are intended to be performed using automated processes without human intervention. While a human being, e.g., a user, may initiate the operation of the illustrative embodiments based on their input to a ChatOps messaging subsystem, the illustrative embodiments of the present invention are not directed to actions performed by the user, but rather logic and functions performed specifically by the improved computing tool on the user input. Moreover, even though the present invention may provide an output that ultimately assists human beings in performing tasks, the illustrative embodiments of the present invention are not directed to actions performed by the human being viewing the results of the processing performed by the mechanisms of the illustrative embodiment, but rather to the specific operations performed by the specific improved computing tool of the present invention which facilitate performance of the requested tasks. Thus, the illustrative embodiments are not organizing any human activity, but are in fact directed to the automated logic and functionality of an improved computing tool.

Figure 3:
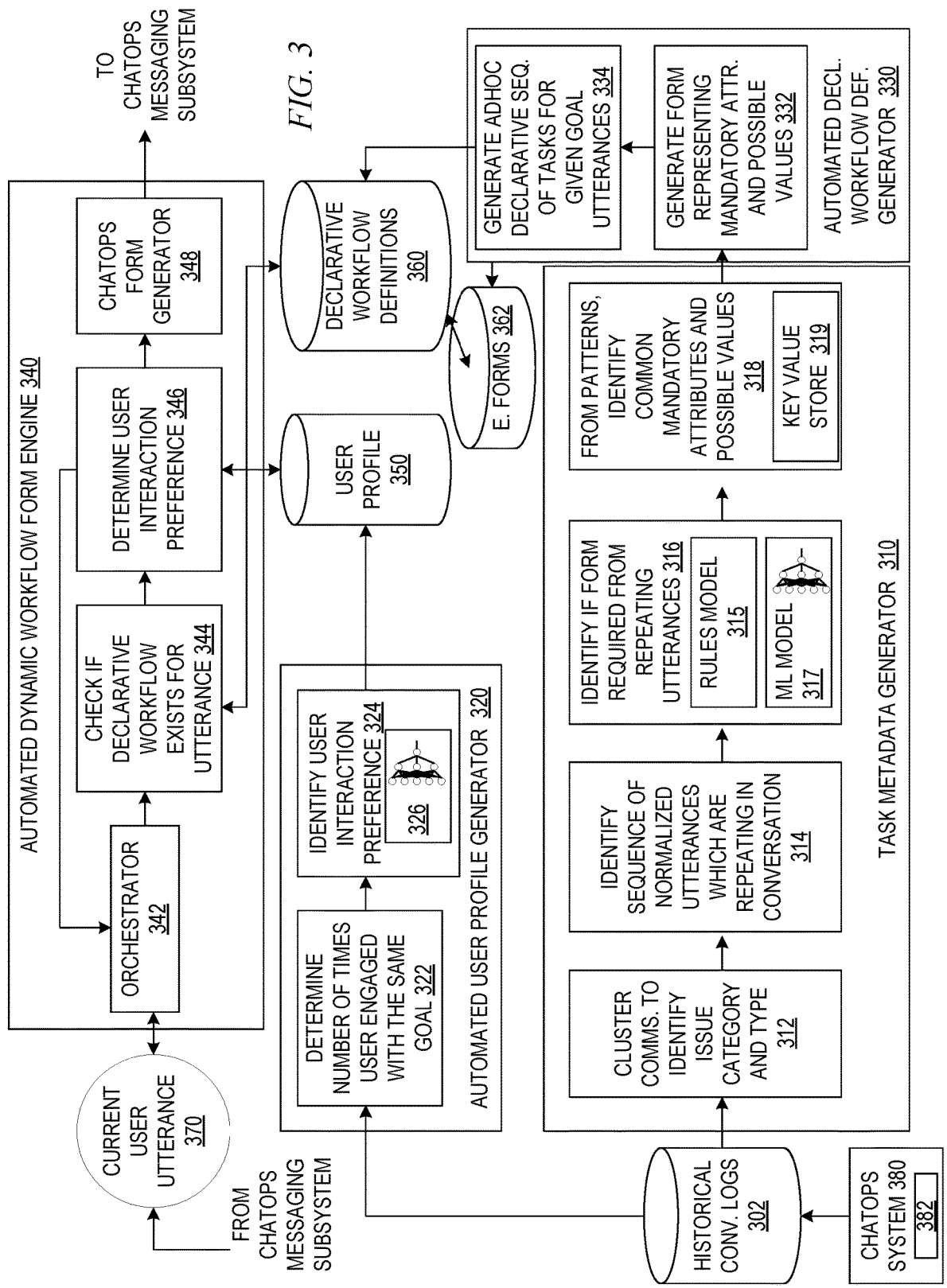
FIG. 3 is an example diagram of the primary operational elements of an automated workflow electronic communication messaging computing tool in accordance with one illustrative embodiment.

FIG. 3 is an example diagram of the primary operational elements of an automated workflow electronic communication messaging computing tool in accordance with one illustrative embodiment. As shown in FIG. 3, the primary operational elements include a task metadata generator 310, an automated user profile generator 320, an automated declarative workflow definition generation 330, and an automated dynamic workflow form engine 340. These elements 310-340 each comprise internal logic and data structures to perform the corresponding operations/functionality represented by the blocks within these elements 310-340. These logic and data structures may be implemented as algorithms, applications, and the like, executed and/or stored in computer hardware, such as processors and memories, where the instructions of the algorithms, applications, and the like are loaded into memory and then executed by processors. In some illustrative embodiments, dedicated hardware devices may be provided, such as hard wired devices, firmware, and the like, which perform one or more of the functionalities/operations of the elements 310-340, and of course combinations of algorithms, applications, and dedicated hardware devices may also be utilized without departing from the spirit and scope of the present invention.

In some illustrative embodiments, the logic of the task metadata generator 310 and the automated user profile generator 320 may implement machine learning computer models, such as neural network computer models and the like, which are trained through machine learning processes to perform predictions and classifications as described herein. The task metadata generator 310 learns from patterns in historical communication data, through machine learning processes, what metadata is associated with frequently occurring normalized utterances. The automated user profile generator 320 learns from patterns in historical communication data, through machine learning processes, whether a user prefers electronic form input or non-electronic form input in general and/or with specific utterances.

As shown in FIG. 3, a ChatOps system 380 provides historical conversation logs 302 to the task metadata generator 310 and the automated user profile generator 320. More specifically, the historical conversation logs 302 are stored conversation data for interactions between users during sessions in the ChatOps messaging subsystem 382, where these conversations may have similar formats as that shown in FIG. 1A, but with different content and sequences depending on the particular tasks being performed. Feature extraction is performed on the historical conversation log data to extract features for clustering communications in the task metadata generator 310 and for performing evaluations as to whether users engaged in the logged conversations are likely to want to use electronic forms to input information as part of a conversation or if they wish to use conversational means. This feature extraction may be separated and perform for these two purposes in the logic of the task metadata generator 310 and automated user profile generator 320 or may be a single engine used by both the task metadata generator 310 and automated user profile generator 320.

In some illustrative embodiments, the feature extractor logic comprises natural language processing computer tools, e.g., parsers, named entity recognition, key terms/phrases identification, and the like, which extract features from the natural language content of the historical conversation log data structures 302 and vectorize these extracted features to generate vector representations which may be used as input to machine learning computer models. Feature extraction and vectorization of features from natural language content is generally known and thus, a more detailed explanation is not presented herein.

With regard to the illustrative embodiments, however, the feature extraction is specific to issues/tasks that are referenced in the natural language content of the historical conversation log data 302. Based on the extracted features, and their vectorization, the vector representations of these features may be used in a first operation 312 to cluster sequences of communications, and thus the issues/tasks mentioned in these communications of the various conversation log data structures 302, such as by using cosine similarity, other distance measure based clustering, or Latent Dirichlet Allocation (LDA) or similar topic discovery methods in natural language processing, so as to cluster conversation logs that have similar issues/tasks specified in the content of the conversation logs, to thereby identify issue/task categories and types. Examples of the issue categories include OpenShift Cluster, IBM Cloud, AWS, etc. Examples of issue types include request for provisioning, request for de-provisioning, request for increasing/decreasing allocated resources, raising a support ticket if the system is down, etc. Once clusters are generated, the most common keywords can be identified through frequency analysis and merged to generate normalized forms of issue categories and types. Extractive summarization techniques, e.g., TextRank, or the like, may be used for this purpose. Once identified, the issue categories and types are stored in a query-able database. From these issue categories and types, normalized utterances may be generated by predefined concatenation rules, e.g., request (Issue Type)+OpenShift Cluster (Issue Category)+on (insert preposition using predefined rule)+IBM Cloud (Issue Category).

For each cluster generated by the clustering operation 312, sequences of normalized utterances which are repeated across conversations are identified. Some normalized utterances may be obtained from issue categories and types as described above, coming from the output of operation 312, which are stored in a query-able database so that utterances which contain matching key phrases are mapped to the corresponding normalized forms which are generated from the issue categories and types using predefined concatenation rules. For example, the utterance "can you please provision an OpenShift Cluster hosted on IBM Cloud" contains the key phrases "OpenShift cluster" and "IBM Cloud" which are issue categories, and "Provision" which is an issue type. The predefined concatenation rules may then generate the normalized form "provision OpenShift Cluster on IBM Cloud" for this utterance. Other normalized utterances which do not map to issue categories and types are simply the output of a stemming/lemmatization algorithm which consumes the input utterance and generates a normalized output utterance, e.g., Porter Stemmer, WordNet Lemmatizer, or the like.

These sequences may comprise a trigger normalized utterance followed by one or more additional utterances and a terminating condition, such as an action being taken, an indication of an action having been taken in content of a text of the conversation, a closing of the conversation, or the occurrence of another triggering normalized utterance. In examples of the illustrative embodiments, triggering normalized utterances are those that request that a user or other entity perform an action, for example, but other triggering normalized utterances may be utilized without departing from the spirit and scope of the present invention.

The sequences of normalized utterances that are identified are those that are repeated across multiple conversation log data structures. Thus, for example, if a sequence of utterances occurs only once, or very seldomly, e.g., only a small number of times across the various conversation logs, then implementation of electronic form input is generally not going to provide much improvement over existing conversation based interchanges (see FIG. 1A). However, those sequences that are repeated often will provide a greater impact on performance and user satisfaction if electronic form based enhancements to ChatOps messaging subsystems are utilized.

Having identified sequences of normalized utterances which are repeating in conversations of the historical conversation log data 302, as represented in the clusters of 312, logic 316 of the task metadata generator 310 determines for these repeating sequences of normalized utterances a frequency of occurrence, to determine, for each cluster of issues/tasks, which normalized utterances are frequently occurring. For example, one or more threshold frequency values may be predetermined and the frequency of occurrence of an utterance may be compared to these one or more threshold frequency values to determine if the frequency equals or exceeds at threshold, in which case the corresponding normalized utterance may be tagged a frequently occurrent normalized utterance.

For these frequently occurring normalized utterances, logic 316 determines whether one or more electronic forms can be generated for minimizing the interactions between entities associated with the sequence of normalized utterances, e.g., a single electronic form or sequence of electronic forms that encapsulates the interchange between users as a set of text and fields into which a user can provide input to specify various attributes associated with the issue/task, e.g., number of CPUs, amount of memory, cluster name, whether the cluster is open or dedicated, etc. In some illustrative embodiments, this determination may be performed by applying a rule-based classifier computing model 315 or trained neural network computer model 317 to evaluate a pattern of characteristics in the sequence of normalized utterances and classify the sequences as one that should or should not be represented as an electronic form. For the trained neural network computer model 317, the computer model is trained on features of sequences of normalized utterances for which electronic forms are appropriate, and features of sequences of normalized utterances for which electronic forms are not appropriate. Thus, through the machine learning training, the trained neural network computer model 317 learns patterns of sequences of normalized utterances that are indicative of sequences that can be replaced by electronic forms and thereby classify new sequences of normalized utterances as to whether they should be replaced or represented as electronic forms and as an ad hoc declarative workflow definition.

For those frequently occurring sequences of normalized utterances that are determined to be ones for which electronic forms may be used, the patterns of characteristics may be further evaluated by the logic 318 to determine common mandatory attributes and their possible values. For example, the logic 318 may implement natural language processing to identify key terms/phrases in the subset of frequently occurring sequences of normalized utterances for which electronic forms may be used, where these key terms/phrases are indicative of mandatory attributes specified in instances where a request for information is presented in the interchanges represented in the sequence of normalized utterances, followed by a user entering a response may be identified and the particular user response may be used to determine the possible values for the attributes. That is, a key value store 319 of the logic 318 may be maintained that stores previously supplied input values for corresponding attributes, such that these key values may be used as suitable electronic form inputs values that may be presented to subsequent users as part of the electronic form, e.g., as suggestions or selectable options. The identification of the possible values from the key value store 319 may include identifying the types of the values and ranges of the input values, e.g., Boolean (yes/no), ordinal (low/medium/high), restricted choices (32 GB, 64 GB, etc.), and the like.

Thus, through the operation of the task metadata generator 310, the task metadata is determined which includes the frequently occurring sequences of normalized utterances, and the corresponding mandatory attributes and their associated possible values for these frequently occurring sequences of normalized utterances. This metadata may be provided to the automated declarative workflow definition generator 330 which uses this metadata to automatically construct one or more electronic forms, via the logic 332, which provide user interfaces for collecting the mandatory attribute values for the attributes when subsequent similar tasks are being performed through the ChatOps system 380, as may be indicated by subsequent instances of the triggering normalized utterance, for example. That is, one or more electronic forms may be automatically generated for the workflow represented by the sequence of normalized utterances, where different electronic forms may be generated for different levels of users, e.g., one for lower level users, a second one for management level users, etc., or for users that have different levels of responsibility. The particular fields that are presented in the electronic forms are determined from the mandatory attributes determined by the task metadata generator 310 and presented in the received metadata. In addition, the data types for the possible values are analyzed and mapped to specific types of user interface elements, e.g., drop down menus, free-text fields, checkboxes, etc. For example, if the possible value data type is a range of values, then the mapping may indicate that a drop-down menu should be utilized. If the possible value data type is a label or text, then a free-form text entry field may be utilized. If the value data type is a Boolean value, then checkboxes for the various Boolean values may be used. Moreover, virtual user interface buttons for progressing to the next stage of the sequence, e.g., next level of user, may be provided in the user interfaces of the electronic forms, as determined from the sequence of normalized utterances and the users providing them in the sequence. Any suitable mapping between possible value data types and user interface elements may be used without departing from the spirit and scope of the present invention.

The automated declarative workflow definition generator 330 generates an ad hoc declarative workflow definition for the sequence of normalized utterances which is linked to the electronic forms in the electronic forms repository 362. It should be appreciated that no all sequences of normalized utterances are suitable for being converted to forms. In order to obtain a declarative workflow specification, a valid sequence of normalized utterances is first obtained that has been identified by the rules model 315 or ML model 317 as suitable for being converted to forms. If required, the valid sequences of normalized utterances identified by operation 316 may be stored in non-volatile memory, preferability in a format suitable for processing by a computer program, e.g., in extended markup language (XML) format or the like. Predefined rules convert a normalized utterance to a form element in a markup language, e.g., HTML or the like. The markup language, e.g., HTML, code that generates the form is stored in an actuator that is created by a generator program. The generator program may be a script that is invoked periodically or after sequence mining is complete, and operates to convert mined valid sequences of normalized utterances to HTML code using predefined rules and stores the HTML code that generates the forms as a "skill" in the actuator template.

The declarative workflow definition is generated by using a goal-directed conversational agent which incorporates the actuator that has been thus equipped with the skill. Such an agent includes an evaluator which evaluates the skills, and an actuator which executes the skills. The declarative workflow definition, at its core, includes a set of variables that model the state of the world and actions that depend and operate on those variables to define capabilities that the goal-directed conversation agent has to effect changes in the world. In the context of a goal-directed conversation agent, actions can be either speech actions that interact directly with an end user, or internal actions such as logical inferences or API calls. In the context of the present invention, the variable that models the state of the world may be the triggering normalized utterance, and the action of the goal-directed conversational agent, which is taken in response to this triggering normalized utterance, is to generate the form using the skill in the actuator and serve it to the user in the messaging interface of the ChatOps messaging subsystem 382.

Thus, an actuator template may be used and populated with references to the electronic form so as to define the workflow for presenting the electronic forms to users in response to detection of a triggering normalized utterance. That is, in response to the same triggering normalized utterance being found in a subsequent interchange in the ChatOps messaging subsystem 382, the corresponding actuator, which executes logic to present the electronic form(s), may be automatically retrieved from the declarative workflows definition data storage 360 and executed to present electronic forms retrieved from the electronic forms repository 362 and presented to the user via the ChatOps messaging subsystem 382, e.g., in the example of FIG. 1A, in response to detecting another instance of "request Open-Shift cluster", an electronic form for Request for OCP cluster may be retrieved which has fields for specifying the number of CPUs required, the amount of memory required, the type of cluster (shared/dedicated) requested, and the cluster name.

In some illustrative embodiments, to generate the declarative workflow definitions and electronic forms, the logic of the automated declarative workflow definition generator 330 may implement a natural language understanding (NLU) computer model which is trained to classify the intent of the sequence of normalized utterances, where the intent is represented by a sequence of necessary steps that must follow the triggering normalized utterance of the sequence. If more than one set of necessary steps is possible, then in some illustrative embodiments, a prediction computer model may be used to predict the intent from amongst the multiple possibilities to identify the most likely one. From the determination of the intent, an ad hoc declarative sequence of tasks for the given sequence of normalized utterances is generated along with a corresponding one or more electronic forms representing the mandatory attributes and their possible values.

In some illustrative embodiments, the historical conversation data 302 may be further used by the automated user profile generator 320 to identify user interaction preferences and define a user profile, in the user profile storage 350, for a given user. That is, from the historical conversation data 302, the logic 322 of the automated user profile generator 320 identifies users involved in conversations in the conversation data 302 and extracts features from the conversation data 302 indicative of various characteristics including characteristics specifying whether the user repeatedly asks the same questions, or submits the same requests, number of times the user has engaged in certain types of conversations, and whether the user has used electronic-form based input before and has approved of it, or at least has not disapproved of it. For example, if a user asks the same questions, use of electronic forms reduces the time and effort on the part of the user by no longer requiring the user to repeatedly submit the same question. If the user has engaged in certain types of conversations many times, then the workflow corresponding to that conversation can be converted to an electronic form which will save the user time and effort. Thus, for determining user preferences, the illustrative embodiments bootstrap the classifier using heuristics that indicate whether the user will save time and effort, or otherwise increase efficiency, by using electronic forms. These, and other, features may be extracted from the conversation data to generate a feature vector for a user.

This process can be performed by the logic 322 for a large number of historical conversations and users so as to generate training and test data sets for training and testing a predictive computer model 326, such as a neural network computer model, to predict whether a user will be amenable to electronic form based interactions or would prefer non-electronic form based interactions, as previously discussed above.

The determinations of these preferences for electronic form based user interfaces during ChatOps messaging subsystem 382 interactions, or for non-electronic form based interactions, may be used to define user profiles, in user profile storage 350, for each user of the ChatOps system. These preferences may be general preferences for all ChatOps messaging subsystem interactions, or may be more fine-grained and associated with specific frequently occurring sequences of normalized utterances, e.g., trigger normalized utterances specifying a task to be performed. These user profiles 350 may be used during runtime operation to determine, for detected trigger normalized utterances, whether to present electronic form user interfaces to users to gather information for performing requested tasks or use conversational interactions.

During runtime operations, a stream of conversation inputs are received, via the ChatOps messaging subsystem 382, as an utterance stream 370. Individual user utterances in the stream 370 may be separately processed via the automated dynamic workflow form engine 340 to determine if the utterances correspond to triggering normalized utterances. The triggering normalized utterances are those that correspond to the issue categories and types of clusters that were identified in 312 and stored in a database, such as declarative workflow definition database 360. A comparison operation may be performed on each utterance of the utterance stream 370, where the comparison operation compares the utterance with the stored normalized utterances for issue categories and types of clusters. Utterances which contain the matching key phrases are mapped to the stored issue categories and types of clusters, and the corresponding normalized utterances are generated and used to retrieve corresponding electronic forms according to the declarative workflow definitions 360 and electronic forms database 362.

The streaming conversation data 370 is provided by the ChatOps messaging subsystem 382 to an orchestrator 342 of the engine 340 that uses a natural language understanding (NLU) model, such as that previously mentioned, to analyze the utterances in the streaming conversation data 370 and determine if a trigger normalized utterance is present. If such a trigger normalized utterance is detected, e.g., "request OpenShift cluster", the logic 344 of the automated dynamic workflow engine 340, which may in fact be part of the orchestrator 342, determines if a declarative workflow definition is already defined for this trigger normalized utterance by performing a lookup operation of the trigger normalized utterance in the declarative workflow definitions storage 360. In addition, logic 346, which may in fact be part of the orchestrator 342, determines whether the particular user that input the trigger normalized utterance is likely to want to use electronic form based input or conversational input for gathering the necessary information to perform the requested task. These operations may be performed at substantially the same time, sequentially, or in any desired order.

If the user is predicted to want to use electronic form based input, and a declarative workflow definition exists in association with the trigger normalized utterance in the storage 360, then the declarative workflow definition with its corresponding electronic form user interface(s), from the electronic forms repository 362, are retrieved and provided to the entities involved in the runtime conversation of the streaming conversation data 370. That is, as part of the streaming conversation data, identities of the entities involved, as well as the organization relationships, e.g., worker, manager, etc., are part of the streaming conversation data 370 and corresponding electronic forms may be sent to these entities in accordance with the defined workflow. Of course, if the user is predicted to not want to use electronic form based input in general or for this particular trigger normalized utterance, then the ChatOps messaging subsystem 382 interchange between users is permitted to continue in a non-electronic form based manner.

In some cases, such as when a user does not already have a predefined user profile, the automated dynamic workflow form engine 340 may ask the user whether or not they wish to use electronic forms to input information for performing a task. Based on the user's input, electronic forms may or may not be used. In addition, this information may be used to generate the user profile in the user profile storage 350 for future use.

It should be appreciated that the electronic forms may be presented to the various users and entities involved in the streaming conversation of the ChatOps messaging subsystem 382 as part of the conversation. For example, if the user enters a triggering normalized utterance, the electronic form user interface for the user may be automatically "pop-up" or inserted into the message stream for the user to interact with and provide the requested user input using the corresponding user interface elements to enter the values for mandatory attributes in accordance with their value data types. This entered information may be used to populate subsequent electronic forms and present subsequent user interfaces of electronic forms to other users and entities in accordance with the declarative workflow definition and implemented by the actuator logic.

FIGS. 4-7 present flowcharts outlining example operations of elements of the present invention with regard to one or more illustrative embodiments. It should be appreciated that the operations outlined in FIGS. 4-7 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 4-7, and may, in some cases, make use of the results generated as a consequence of the operations set forth in FIGS. 4-7, the operations in FIGS. 4-7 themselves are specifically performed by the improved computing tool in an automated manner.

Figure 4:
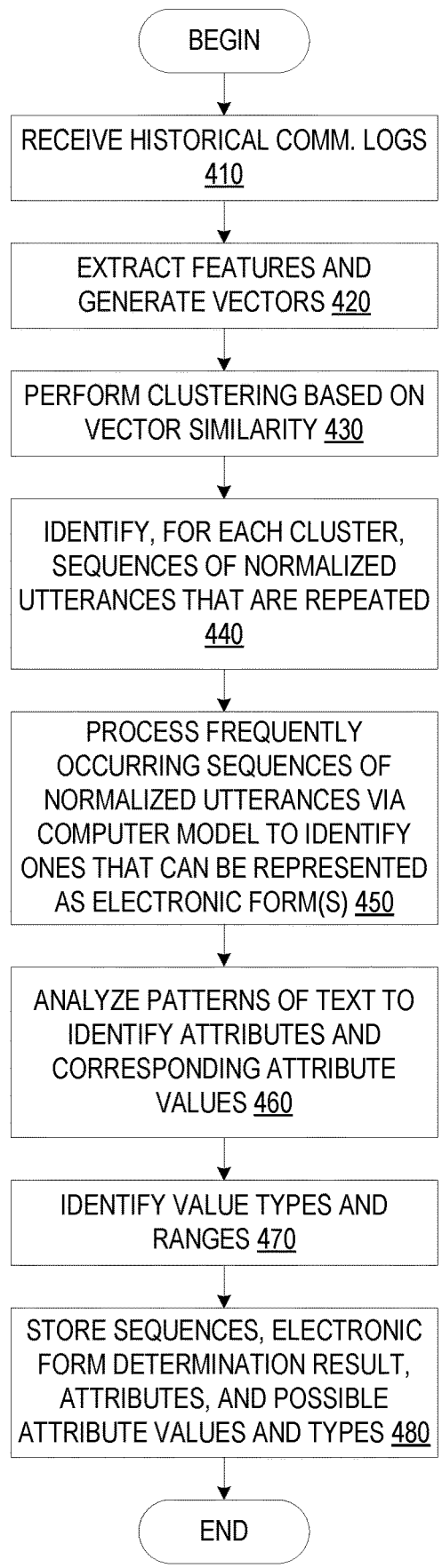
FIG. 4 is a flowchart outlining an example operation for generating task metadata in accordance with one illustrative embodiment.

FIG. 4 is a flowchart outlining an example operation for generating task metadata in accordance with one illustrative embodiment. The operation outlined in FIG. 4 may be implemented by computer logic, provided in software executed on computer hardware, dedicated hardware devices, or any combination of software executed and dedicated hardware device logic. The operation may be performed by the task metadata generator 310 in FIG. 3, for example.

As shown in FIG. 4, the operation starts by receiving historical communication logs from a ChatOps messaging subsystem (step 410). Features are extracted from the historical communication logs, such as by way of key word matching or the like, which specify issues/tasks, and these extracted features are translated into vector representations (step 420). The vector representations are used to perform clustering of sequences of communications into topic clusters using a clustering algorithm, such as Latent Dirichlet Allocation (LDA), various similarity metric based algorithms, or the like (step 430). For each cluster, the sequences of communications in the cluster are processed to identify sequences of normalized utterances that are repeated across such sequences with a predetermined level of frequency (step 440).

Each of the frequently occurring sequences of normalized utterances are processed by a rules based or machine learning trained computer model to determine if the frequently occurrent sequence of normalized utterances can be represented or replaced with an electronic form and corresponding user interface (step 450). In addition, the patterns of text in the communication log data are analyzed to identify specifications of attributes and corresponding input of values (step 460). These attributes and the corresponding values are used to identify types and ranges of input values for the attributes (step 470). The sequences of normalized utterances, result of determining whether electronic forms should be generated, and the attributes and corresponding possible value types are stored for use in generating declarative workflow definitions and corresponding electronic forms (step 480). The operation then terminates.

Figure 5:
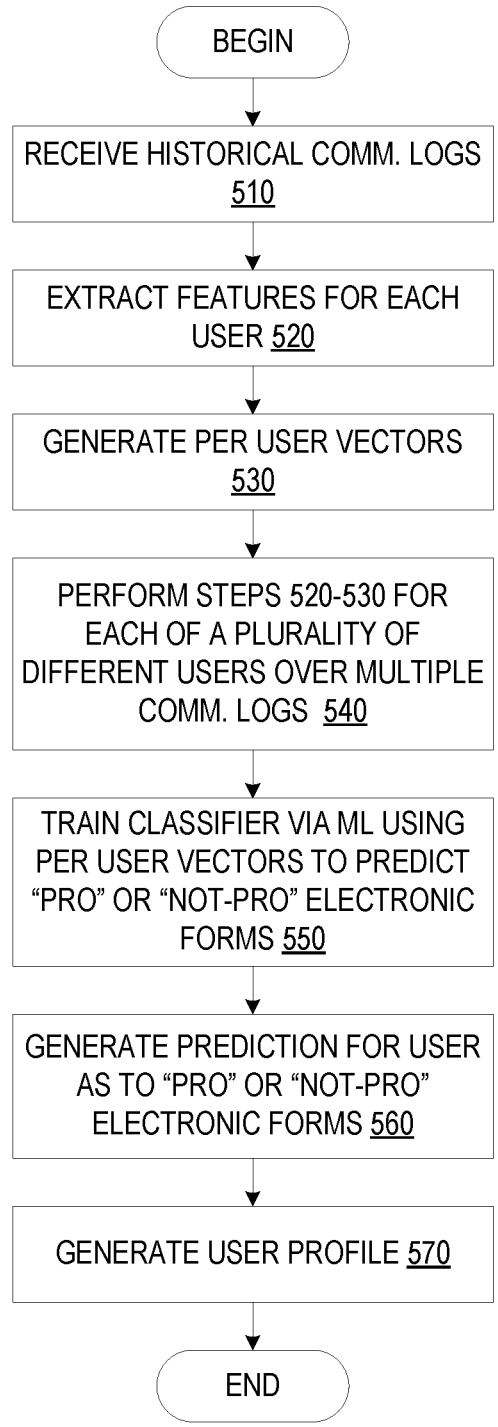
FIG. 5 is a flowchart outlining an example operation for determining a user preference for an electronic form based or electronic conversational interchange in accordance with one illustrative embodiment.

FIG. 5 is a flowchart outlining an example operation for determining a user preference for an electronic form based or electronic conversational interchange in accordance with one illustrative embodiment. The operation outlined in FIG. 5 may be implemented by computer logic, provided in software executed on computer hardware, dedicated hardware devices, or any combination of software executed and dedicated hardware device logic. The operation may be performed by the automated user profile generator 320 in FIG. 3, for example.

As shown in FIG. 5, the operation starts again with receiving historical communication log data from the ChatOps messaging subsystem (step 510). Feature extraction is executed on the communication log data to extract features for each user (step 520). These features, for example, may include features specifying whether the user repeatedly asks the same questions or not, the number of times the user has engaged in certain types of chats, and whether the user has used electronic form based input before and has approved of it, or at least not explicitly disapproved of it. The extracted features are translated to a vector representation on a per user basis, such that each user has their own vector representation in which values in slots of the vector output indicate the various features specific to that user (step 530). This process may be repeated for many different users over many different communication log data structures so as to generate a training dataset and testing dataset for machine learning purposes (step 540).

A machine learning computer model, e.g., a classifier, is trained through machine learning processes on such vector representations for a plurality of users (step 550). The machine learning computer model is thus, trained to predict a classification of "pro" electronic form or "not-pro" electronic form for users given a vector representation of features extracted from communication log data structures in which the user has engaged in interchanges with other users via the ChatOps messaging subsystem (step 560). Based on such predictions being generated for a user, a user profile may be generated or updated to reflect the user's preferences with regard to using electronic form user interfaces to submit input during ChatOps messaging subsystem communications (step 570). The operation then terminates.

Figure 6:
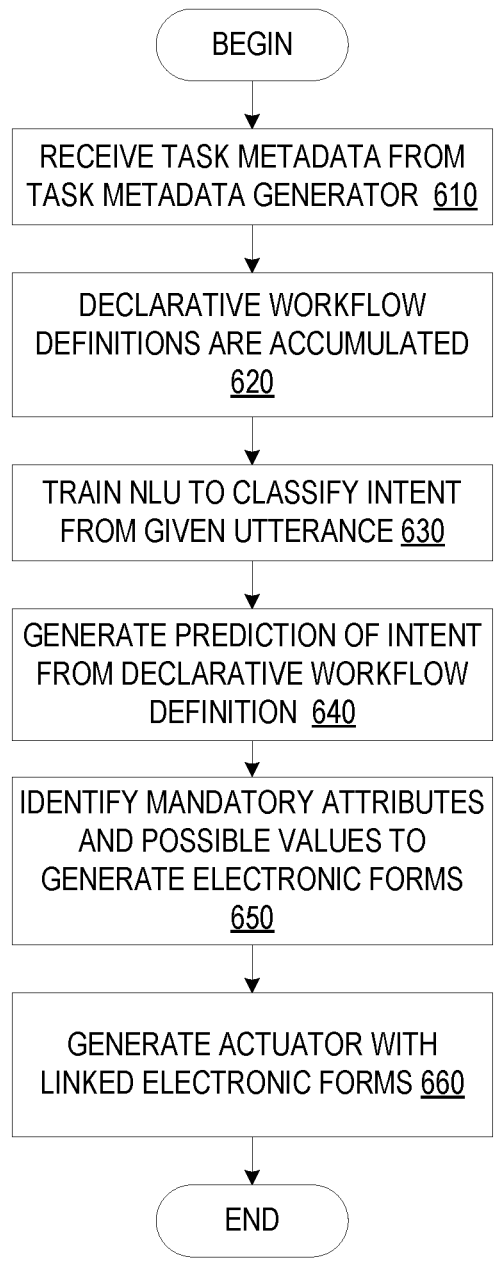
FIG. 6 is a flowchart outlining an example operation for generating declarative workflows in accordance with one illustrative embodiment.

FIG. 6 is a flowchart outlining an example operation for generating declarative workflows in accordance with one illustrative embodiment. The operation outlined in FIG. 6 may be implemented by computer logic, provided in software executed on computer hardware, dedicated hardware devices, or any combination of software executed and dedicated hardware device logic. The operation may be performed by the automated declarative workflow definition generator 330 in FIG. 3, for example.

As shown in FIG. 6, the operation starts by receiving, from the task metadata generator 310 in FIG. 3, for example, a sequence of normalized utterances along with mandatory attributes and possible value types for the attribute values (step 610). Declarative workflow definitions for the workflows are accumulated (step 620). Based on the declarative workflow definitions, a natural language understanding (NLU) computer model is trained to classify the intent from a given utterance where the intent is represented by a sequence of necessary steps (that are embodied by a workflow) that must follow the utterance (step 630). In some illustrative embodiments, this NLU computer model may further include a process prediction model (where a given workflow represents a single process) to identify the most likely sequence given the utterance in cases where multiple possible sequences of necessary steps are possible. Such a process prediction model takes as input a sequence of process steps (prefix) and generates as output the most likely subsequent sequence of process steps (suffix). Such process prediction models are commonly used in process mining literature.

Once trained on a set of declarative workflow specifications, the NLU computer model may receive a triggering normalized utterance as input and predict an intent of that utterance corresponding to the most likely workflow (step 640). In addition, based on the sequence of normalized utterances, mandatory attributes, and the attributes corresponding possible value types, one or more electronic forms are generated that comprise fields corresponding to the mandatory attributes, and having user interface elements corresponding to the possible value types (step 650). The electronic forms may be generated for various different levels or types of users/entities involved in the workflow represented by the sequence of normalized utterances. For example, if certain information is provided by engineers, while other information is provided by support personnel, and still other information is provided by managers, then separate electronic forms may be generated for interfacing with each of these different types/levels of users in the sequence of normalized utterances.

Based on the predicted intent from the NLU computer model, an actuator containing the one or more generated electronic forms for gathering user input may be generated, linked to the generated electronic forms, and stored for later use during runtime operations (step 660). The operation then terminates.

Figure 7:
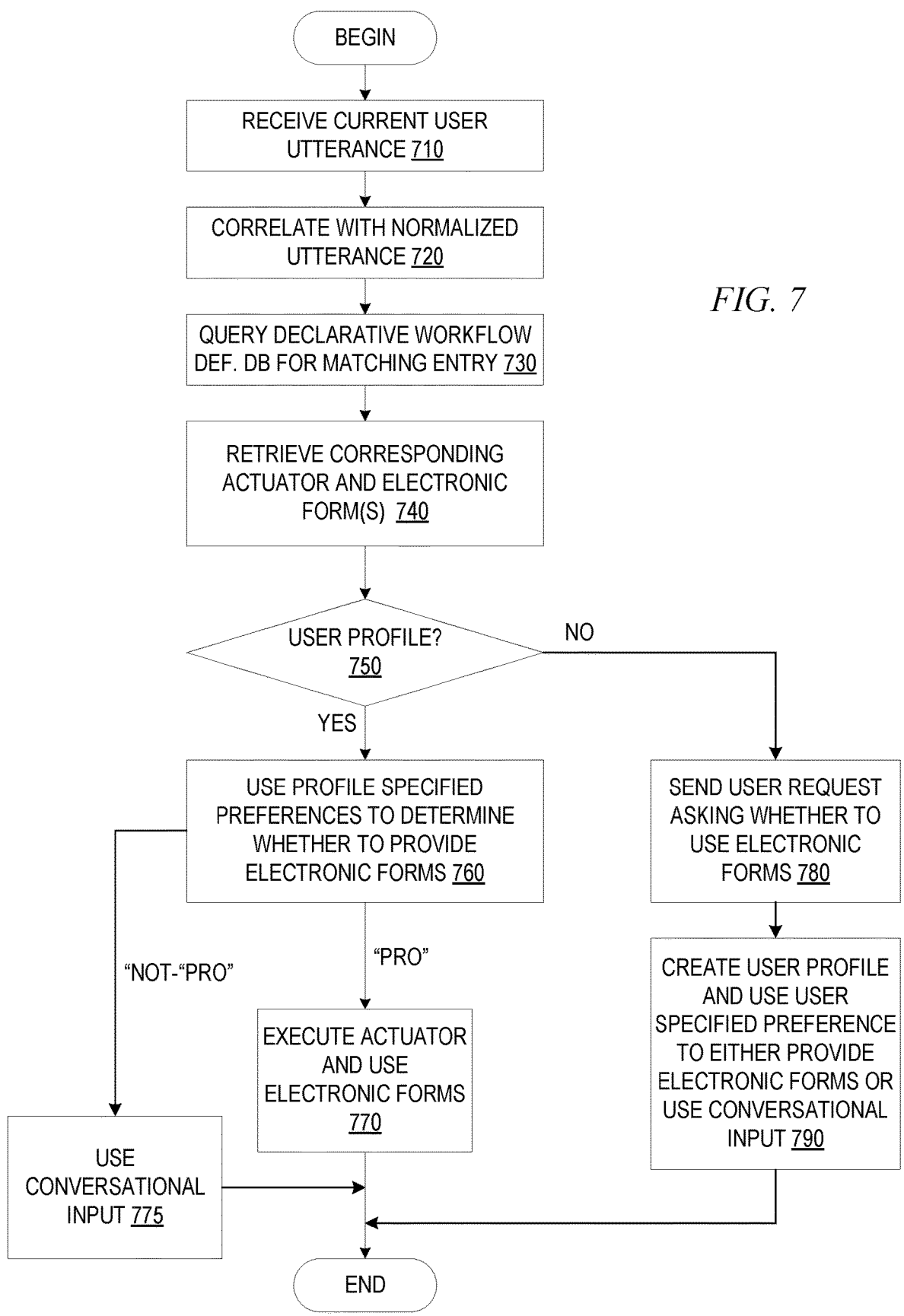
FIG. 7 is a flowchart outlining an example operation for orchestration of an electronic communication interchange including automatically generated electronic forms in accordance with one illustrative embodiment.

FIG. 7 is a flowchart outlining an example operation for orchestration of an electronic communication interchange including automatically generated electronic forms in accordance with one illustrative embodiment. The operation outlined in FIG. 7 may be implemented by computer logic, provided in software executed on computer hardware, dedicated hardware devices, or any combination of software executed and dedicated hardware device logic. The operation may be performed by the automated dynamic workflow form engine 340 in FIG. 3, for example.

As shown in FIG. 7, the operation starts with receiving a current user utterance as part of a runtime stream of utterances from the ChatOps messaging subsystem (step 710). The current utterance is processed through natural language processing to correlate the current utterance with a normalized utterance (step 720). The normalized utterance is used to query the declarative workflow definitions databased to find a matching entry in the database (step 730). In response to the normalized utterance being present in the declarative workflow definitions database, i.e., there is an existing declarative workflow definition for this normalized utterance, the corresponding actuator and electronic forms are retrieved (step 740); otherwise if there is not a matching entry in the database, the operation terminates.

A determination is made as to whether there is a user profile for the user that input the utterance in a user profile database (step 750) and if there is a matching user profile, then the preferences of the user profile are used to determine whether to provide electronic form based interactions with the user or not (step 760). If the preferences indicate that electronic form based interactions should be utilized, then the retrieved actuator and electronic forms are used to present user interfaces via the ChatOps messaging subsystem to gather information and perform actions for completing the requested task in accordance with the declarative workflow definition (step 770). Otherwise, if the user preference is to not use electronic forms, then the interaction proceeds as normal using conversational interactions between users via the ChatOps messaging subsystem (step 775).

If there is not a matching user profile (step 750), a request may be sent to the user asking if they would like to use electronic forms or not (step 780). Based on the user response, a user profile is generated that specifies the user and their preferences, and electronic forms may be presented via the ChatOps messaging subsystem, or not provided, based on the user's input (step 790). The operation then terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides computing tool mechanisms that implement automated processes and machine learning computer models and/or rules based computer models to learn frequently occurring sequences of normalized utterances, mandatory attributes and possible values for these frequently occurring sequences of normalized utterances, user preferences as to whether they wish to use electronic form user interfaces to input information for performing tasks, automatically generate electronic forms and declarative workflow definitions for frequently occurring sequences of normalized utterances, and performing runtime determinations and presentation of electronic forms during ChatOps messaging interchanges in accordance with user preferences. The improved computing tool implements mechanism and functionality, such as automated workflow electronic communication messaging computing tool, which cannot be practically performed by human beings either outside of, or with the assistance of, a technical environment, such as a mental process or the like. The improved computing tool provides a practical application of the methodology at least in that the improved computing tool is able to provide the various functionalities listed above.

Figure 8:
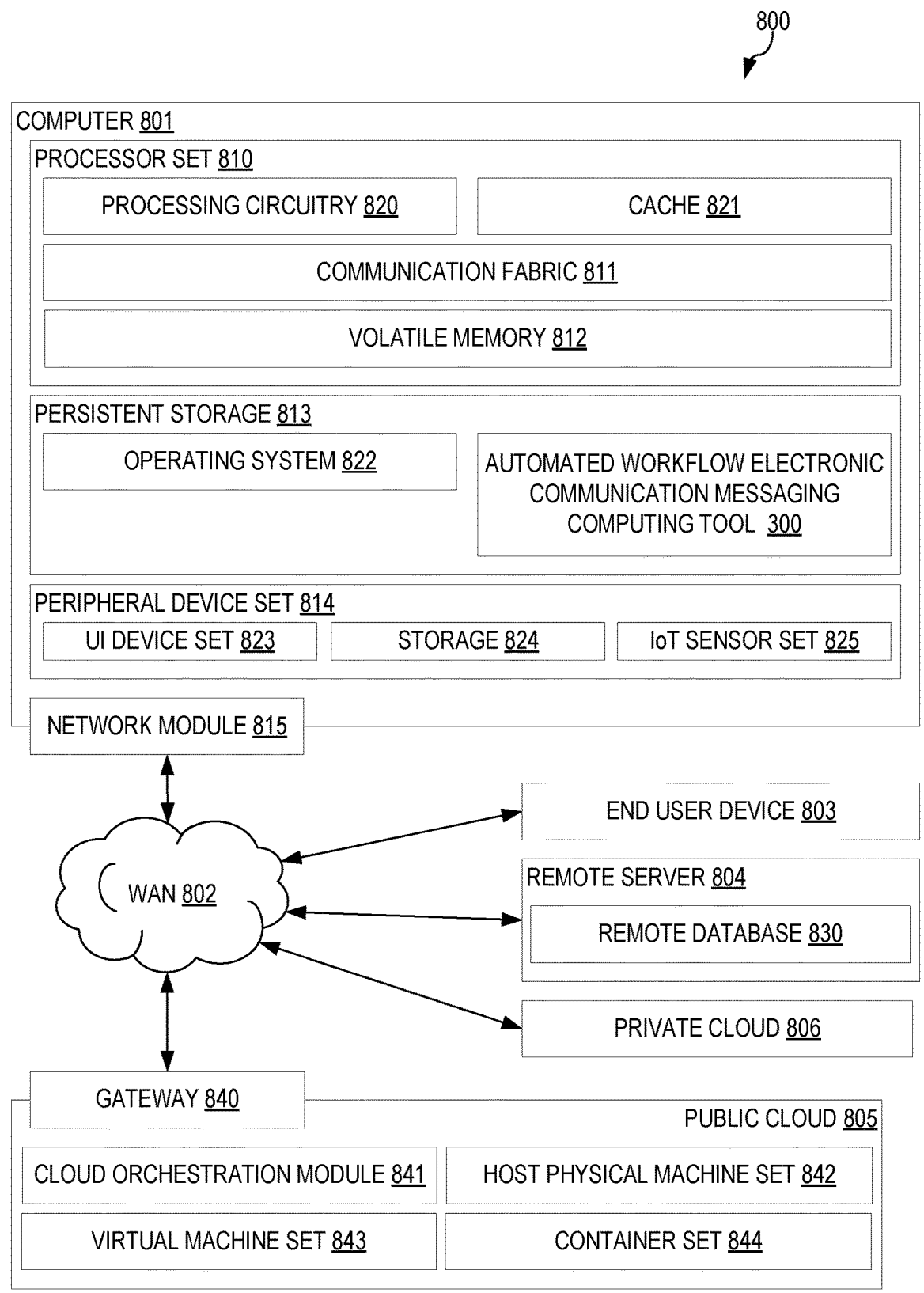
FIG. 8 is an example diagram of a distributed data processing system environment in which aspects of the illustrative embodiments may be implemented and at least some of the computer code involved in performing the inventive methods may be executed.

FIG. 8 is an example diagram of a distributed data processing system environment in which aspects of the illustrative embodiments may be implemented and at least some of the computer code involved in performing the inventive methods may be executed. That is, computing environment 800 contains an example of an environment for the execution of at least some of the computer code involved in performing the inventive methods, such as automated workflow electronic communication messaging computing tool 300. In addition to block 300, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 200, as identified above), peripheral device set 814 (including user interface (UI), device set 823, storage 824, and Internet of Things (IOT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 200 in persistent storage 813.

Communication fabric 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 200 typically includes at least some of the computer code involved in performing the inventive methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Thus, as noted above, the illustrative embodiments provide an improved computing tool and improved computing tool functionality for automatically generating electronic forms for automated presentation to users during ChatOps messaging subsystem conversations for gathering information for performing requested tasks and orchestrating presentation of these electronic forms in accordance with automatically generated declarative workflow definitions associated with triggering normalized utterances. The illustrative embodiments automatically learn preferences of users with regard to whether or not users are likely to want to use electronic form based input of task information or not. During runtime operation, the illustrative embodiments provide automated computing tools for detecting triggering normalized utterances and determining whether to present electronic form based workflows to users/entities involved in runtime streaming conversations in the ChatOps messaging subsystem, and how to present these electronic form based workflows to those involved in the conversation. The result is that, for conversations involving electronic form based task information input, the interchange of messages between users/entities is minimized while still being able to gather user input for performing the requested tasks.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for automated generation of an electronic form for an electronic messaging system, the method comprising:

obtaining historical conversation logs from the electronic messaging system, wherein the historical conversation logs comprise a plurality of communication sequences corresponding to a communication interchange between a plurality of entities, and wherein the plurality of entities are associated with a plurality of levels of hierarchy within an organization;

clustering communication sequences within the historical conversation logs according to similarity of features to thereby generate clusters of communication sequences;

for each cluster in the clusters of communication sequences:
identifying, within each cluster, sequences of normalized utterances that are repeated across communication sequences of the cluster;
categorizing each sequence, in a set of the sequences of normalized utterances, as to whether each sequence can be represented as one or more electronic forms, wherein the categorizing comprises executing at least one of a rule-based classifier computing model on patterns of characteristics of the sequence to classify the sequence as either a first class of sequence for which the one or more electronic forms may be used to gather information gathered as part of the sequence or a second class of sequence for which the one or more electronic forms may not be used, wherein the second class of sequence has a length greater than a predetermined threshold length; and
extracting, for each communication sequence in the cluster, attributes and corresponding attribute values; and generating, for at least one of the clusters, in response to at least one sequence of the at least one cluster being categorized as the first class of sequence, one or more electronic form data structures based on the attributes and corresponding attribute values extracted for each communication sequence in the at least one cluster, wherein generating the one or more electronic form data structures comprises generating a plurality of different electronic form data structures, wherein each different electronic form data structure corresponds to a different entity of the plurality of entities, and wherein different ones of the electronic form data structures in the plurality of different electronic form data structures are associated with different stages of a workflow sequence and are presented, by the electronic messaging system, to corresponding ones of the plurality of entities in accordance with execution of a corresponding stage of the workflow sequence in an order of the workflow sequence.

2. The method of claim 1, further comprising:
  determining, based on an artificial intelligence computer model analysis of the historical conversation logs, a preference for an entity of the plurality of entities with regard to using electronic forms or using a conversational interchange of messages to accomplish tasks; and
  in response to determining that the preference is to use electronic forms, presenting an electronic form, based on the one or more electronic form data structures, to the entity via the electronic messaging system.

3. The method of claim 1, wherein clustering communication sequences within the historical conversation logs comprises executing natural language processing computer logic on the historical conversation logs to extract the features from the historical conversation logs, wherein the features comprise terms or phrases that reference tasks or issues being discussed in the historical conversation logs.

4. The method of claim 1, wherein identifying sequences of normalized utterances that are repeated across communication sequences of the cluster comprises:
  determining a frequency of occurrence of each sequence of normalized utterances in the identified sequences of normalized utterances; and
  selecting the set of the sequences of normalized utterances as those sequences of normalized utterances for which the frequency of occurrence is equal to or greater than a predetermined threshold value.

5. The method of claim 1, further comprising, for each cluster in the clusters of communication sequences, identifying and storing a triggering utterance for the cluster in association with the one or more electronic form data structures, wherein the triggering utterance is an utterance that, when identified in a subsequent electronic communication, triggers presentation of an electronic form in the electronic messaging system based on the associated one or more electronic form data structures.

6. The method of claim 1, further comprising:
  generating an electronic form based on the one or more electronic form data structures, in response to a normalized utterance of the at least one cluster being detected in a subsequent communication interchange of an ongoing electronic communication session between the plurality of entities; and
  presenting the electronic form to at least one entity of the plurality of entities via the electronic messaging system as part of the ongoing electronic communication session, wherein the electronic form comprises fields that are of a type corresponding to the attributes and attribute values.

7. The method of claim 6, wherein the fields present predetermined value options for selection by the at least one entity of the plurality of entities based on the attribute values for attributes corresponding to the fields.

8. The method of claim 1, wherein the electronic messaging system is a subsystem of a ChatOps environment, and wherein the historical conversation logs are logs of asynchronous electronic communications between the plurality of entities via the subsystem.

9. The method of claim 1, wherein each electronic form data structure is associated with a corresponding level of hierarchy of the plurality of levels of hierarchy, and wherein different electronic form data structures are presented to different entities of the plurality of entities in accordance with a level of hierarchy associated with each entity of the plurality of entities, and wherein different stages of the workflow sequence are associated with different entities having different entity roles.

10. A non-transitory computer-readable medium storing a set of instructions for an automated generation of electronic form for an electronic messaging system, the set of instructions comprising:
  one or more instructions that, when executed by one or more processors of a device, cause the device to:
  obtain historical conversation logs from an electronic messaging system, wherein the historical conversation logs comprise a plurality of communication sequences corresponding to a communication interchange between a plurality of entities, and wherein the plurality of entities are associated with a plurality of levels of hierarchy within an organization;
  cluster communication sequences within the historical conversation logs according to similarity of features to thereby generate clusters of communication sequences;
  for each cluster in the clusters of communication sequences:
    identify, within each cluster, sequences of normalized utterances that are repeated across communication sequences of the cluster;
    categorize each sequence, in a set of the sequences of normalized utterances, as to whether each sequence can be represented as one or more electronic forms, wherein the categorizing comprises executing at least one of a rule-based classifier computing model on patterns of characteristics of the sequence to classify the sequence as either a first class of sequence for which the one or more electronic forms may be used to gather information gathered as part of the sequence or a second class of sequence for which the one or more electronic forms may not be used, wherein the second class of sequence has a length greater than a predetermined threshold length; and
    extract, for each communication sequence in the cluster, attributes and corresponding attribute values; and
  generate, for at least one of the clusters, in response to at least one sequence of the at least one cluster being categorized as the first class of sequence, one or more electronic form data structures based on the attributes and corresponding attribute values extracted for each communication sequence in the at least one cluster, wherein generating the one or more electronic form data structures comprises generating a plurality of different electronic form data structures, wherein each different electronic form data structure corresponds to a different entity of the plurality of entities, and wherein different ones of the electronic form data structures in the plurality of different electronic form data structures are associated with different stages of a workflow sequence and are presented, by the electronic messaging system, to corresponding ones of the plurality of entities in accordance with execution of a corresponding stage of the workflow sequence in an order of the workflow sequence.

11. The non-transitory computer-readable medium of claim 10, wherein the one or more instructions, to cause the device to generate the electronic form for the electronic messaging system, cause the device to:
  determine, based on an artificial intelligence computer model analysis of the historical conversation logs, a preference for an entity of the plurality of entities with regard to using electronic forms or using a conversational interchange of messages to accomplish tasks; and in response to determining that the preference is to use electronic forms, present an electronic form, based on the one or more electronic form data structures, to the entity via the electronic messaging system.

12. The non-transitory computer-readable medium of claim 10, wherein the one or more instructions, to cause the device to cluster communication sequences within the historical conversation logs, cause the device to:
   execute natural language processing computer logic on the historical conversation logs to extract the features from the historical conversation logs, wherein the features comprise terms or phrases that reference tasks or issues being discussed in the historical conversation logs.

13. The non-transitory computer-readable medium of claim 10, wherein the one or more instructions, to cause the device to identify sequences of normalized utterances that are repeated across communication sequences of the cluster, cause the device to:
   determine a frequency of occurrence of each sequence of normalized utterances in the identified sequences of normalized utterances; and
   select the set of the sequences of normalized utterances as those sequences of normalized utterances for which the frequency of occurrence is equal to or greater than a predetermined threshold value.

14. The non-transitory computer-readable medium of claim 10, wherein the one or more instructions, to cause the device to generate the electronic form for the electronic messaging system, for each cluster in the clusters of communication sequences, cause the device to:
   identify and store a triggering utterance for the cluster in association with the one or more electronic form data structures, wherein the triggering utterance is an utterance that, when identified in a subsequent electronic communication, triggers presentation of an electronic form in the electronic messaging system based on the associated one or more electronic form data structures.

15. The non-transitory computer-readable medium of claim 10, wherein the one or more instructions, to cause the device to generate the electronic form for the electronic messaging system, cause the device to:
   generate an electronic form based on the one or more electronic form data structures, in response to a normalized utterance of the at least one cluster being detected in a subsequent communication interchange of an ongoing electronic communication session between the plurality of entities; and
   present the electronic form to at least one entity of the plurality of entities via the electronic messaging system as part of the ongoing electronic communication session, wherein the electronic form comprises fields that are of a type corresponding to the attributes and attribute values.

16. The non-transitory computer-readable medium of claim 15, wherein the fields present predetermined value options for selection by the at least one entity of the plurality of entities based on the attribute values for attributes corresponding to the fields.

17. The non-transitory computer-readable medium of claim 10, wherein each electronic form data structure is associated with a corresponding level of hierarchy of the plurality of levels of hierarchy, and wherein different electronic form data structures are presented to different entities of the plurality of entities in accordance with a level of hierarchy associated with each entity of the plurality of entities, and wherein different stages of the workflow sequence are associated with different entities having different entity roles.

18. An apparatus comprising:
   one or more processors; and
   one or more memory devices coupled to the one or more processors, wherein the one or more processors are configured to:
   obtain historical conversation logs from an electronic messaging system, wherein the historical conversation logs comprise a plurality of communication sequences corresponding to a communication interchange between a plurality of entities, and wherein the plurality of entities are associated with a plurality of levels of hierarchy within an organization;
   cluster communication sequences within the historical conversation logs according to similarity of features to thereby generate clusters of communication sequences;
   for each cluster in the clusters of communication sequences:
      identify, within each cluster, sequences of normalized utterances that are repeated across communication sequences of the cluster;
      categorize each sequence, in a set of the sequences of normalized utterances, as to whether each sequence can be represented as one or more electronic forms, wherein the categorizing comprises executing at least one of a rule-based classifier computing model on patterns of characteristics of the sequence to classify the sequence as either a first class of sequence for which the one or more electronic forms may be used to gather information gathered as part of the sequence or a second class of sequence for which the one or more electronic forms may not be used, wherein the second class of sequence has a length greater than a predetermined threshold length; and
      extract, for each communication sequence in the cluster, attributes and corresponding attribute values; and
   generate, for at least one of the clusters, in response to at least one sequence of the at least one cluster being categorized as the first class of sequence, one or more electronic form data structures based on the attributes and corresponding attribute values extracted for each communication sequence in the at least one cluster, wherein generating the one or more electronic form data structures comprises generating a plurality of different electronic form data structures, wherein each different electronic form data structure corresponds to a different entity of the plurality of entities, and wherein different ones of the electronic form data structures in the plurality of different electronic form data structures are associated with different stages of a workflow sequence and are presented, by the electronic messaging system, to corresponding ones of the plurality of entities in accordance with execution of a corresponding stage of the workflow sequence in an order of the workflow sequence.

19. The apparatus of claim 18, wherein the one or more processors are further configured to:
   determine, based on an artificial intelligence computer model analysis of the historical conversation logs, a preference for an entity of the plurality of entities with regard to using electronic forms or using a conversational interchange of messages to accomplish tasks; and in response to determining that the preference is to use electronic forms, present an electronic form, based on the one or more electronic form data structures, to the entity via the electronic messaging system.

20. The apparatus of claim 18, wherein to cluster communication sequences within the historical conversation logs, the one or more processors are configured to:
execute natural language processing computer logic on the historical conversation logs to extract the features from the historical conversation logs, wherein the features comprise terms or phrases that reference tasks or issues being discussed in the historical conversation logs.

* * * * *